US005538770A

United States Patent [19]
Bekele

[11] Patent Number: 5,538,770
[45] Date of Patent: Jul. 23, 1996

[54] VINYLIDENE CHLORIDE FILM WITH CONTROLLED GAS PERMEABILITY

[75] Inventor: Solomon Bekele, Taylors, S.C.

[73] Assignee: W. R. Grace & Co. -Conn., Duncan, S.C.

[21] Appl. No.: 341,819

[22] Filed: Nov. 18, 1994

[51] Int. Cl.⁶ .......................... B29D 22/00; B32B 27/38; C08L 27/08
[52] U.S. Cl. .................. 428/36.7; 428/414; 428/516; 428/518; 428/520; 428/910; 524/306
[58] Field of Search ..................... 428/516, 518, 428/414, 520, 36.7, 910

[56] References Cited

U.S. PATENT DOCUMENTS 3,741,253  6/1973  Brax et al. .............................. 138/137
4,112,181  9/1978  Baird, Jr. et al. ....................... 428/336
5,202,188  4/1993  Bekele .................................... 428/414

FOREIGN PATENT DOCUMENTS

0530622A1  3/1993  European Pat. Off. .

Primary Examiner—P. C. Sluby
Attorney, Agent, or Firm—Mark Quatt

[57] ABSTRACT

An extrudable vinylidene chloride composition is useful in packaging films where controlled $CO_2$ and $O_2$ transmission rates benefit the packaging of products such as gassing cheese. The compositon, and film made therefrom, comprises 100 parts by weight of at least one vinylidene chloride copolymer; between 4 and 15 parts by weight of a plasticizer; and between 4 and 15 parts by weight of an acrylate/styrene copolymer; wherein the total amount of plasticizer and acrylate/styrene copolymer comprises at least 9 parts by weight.

7 Claims, No Drawings

VINYLIDENE CHLORIDE FILM WITH CONTROLLED GAS PERMEABILITY

BACKGROUND OF THE INVENTION

The present invention relates to films made from vinylidene chloride polymers or copolymers; more particularly to a method, composition, and film for controlling the oxygen and carbon dioxide transmission and stickiness, and enhancing the free flowability and thermal stability of monolayer and multilayer packaging films having a plasticized layer of vinylidene chloride copolymer film.

Thermoplastic packaging films made of vinylidene chloride copolymer, here referred to as "saran", have long been used to package food such as cheese, fresh meat, etc. Saran is a good barrier to the transmission of oxygen.

Methods of producing a multilayer film having a layer of saran are disclosed in U.S. Pat. No. 4,112,181 (Baird) and U.S. Pat. No. 3,741,253 (Brax et al), both incorporated herein by reference. Saran is typically plasticized and stabilized for purposes of extrusion. One example is epichlorohydrin/bisphenol A, and epoxy resin, and 2-ethyl hexyl diphenyl phosphate.

U.S. Pat. No. 5,202,188 discloses a vinylidene chloride composition comprising 1 to 4% plasticizer, 1 to 4% acrylate/styrene polymer, and the balance of 92 to 98% comprising a vinylidene chloride copolymer. Although this film has proven commercially useful in many packaging applications requiring high oxygen barrier, it does not address the needs of packaging applications such as gas ($CO_2$) producing cheeses, and produce (vegetables) where a moderate $O_2$ barrier combined with relatively high $CO_2$ transmission is often required.

A commercial composition currently used to make film for packaging gassing cheese includes 100 parts VDC/VC plus three liquid plasticizers: five parts of Plastolein 9759-A (a polymeric condensation product of azelaic acid and 1,3-butandiol), three parts of Plasthall HA7A, a polymeric plasticizer of polyester of adipic acid and propylene glycol, and one part Plas-chek 775, an epoxidized soybean oil. It has been found that blends with liquid plasticizers do not free flow very well and thus require a grinding step before extrusion. This process, coupled with some migration of the liquid additives out of the VDC/VC matrix, causes inconsistency, i.e. lack of homogeneity in the composition of the resulting blend. This inconsistency in turn leads to inconsistency in the $O_2$ and $CO_2$ transmission rates of packaging films made from the blend. This is important, because consistent $O_2$ and $CO_2$ transmission rates are needed to insure a commercially acceptable package system. When these gas rates can be controlled predictably, the amount of the additives can be adjusted to optimize the transmission rates for the intended end use.

Some cheese products are produced in such a way that the final cheese product emits a significant amount of carbon dioxide over time. In such cases, it is often desirable to provide a packaging material which is characterized by a relatively low oxygen transmission rate to protect the cheese product from oxidative degradation in quality or shelf life. It is also desirable to have a sufficiently high carbon dioxide transmission to allow the naturally generated $CO_2$ to escape from the package, and avoid undesirable ballooning of the package.

The present invention provides a composition, and film, with a higher total mount of plasticizer and stabilizer than that shown in the art, and therefore a film suitable for packaging applications where $O_2$ and $CO_2$ transmission rates are important. In preferred embodiments, the invention provides not only a higher amount of plasticizer and stabilizer, but also a relatively lower amount of liquid plasticizer in the blend. The resulting improvements in free flowability save an extra grinding step in preparing the composition, and also offer a more controlled, consistent $O_2$ and $CO_2$ transmission.

The present invention also provides good thermal stability for saran formulations, and they do not degrade to any significant extent during extrusion. Methods for determining stability are well known, e.g. as described in U.S. Pat. No. 5,202,188 incorporated herein by reference.

SUMMARY OF THE INVENTION

In one aspect of the invention, an extrudable vinylidene chloride composition comprises 100 parts by weight of at least one vinylidene chloride copolymer; between 4 and 15 parts by weight of a plasticizer; and between 4 and 15 parts by weight of an acrylate/styrene copolymer; wherein the total amount of plasticizer and acrylate/styrene copolymer comprises at least 9 parts by weight.

In another aspect, a polymeric film comprises at least one layer comprising 100 parts by weight of at least one vinylidene chloride copolymer; between 4 and 15 parts by weight of a plasticizer; and between 4 and 15 parts by weight of an acrylate/styrene copolymer; wherein the total amount of plasticizer and acrylate/styrene copolymer comprises at least 9 parts by weight.

DEFINITIONS

As used herein:

"Plasticizer" means a material incorporated in a film to increase flexibility, workability, or extrudability of the film.

"Acrylate/styrene polymer" means an additive that has acrylate or styrene moieties, or both, such as methyl methacrylate/butyl acrylate/styrene terpolymer, methyl methacrylate/butyl acrylate/butyl methacrylate terpolymer, or poly (alpha-methyl styrene).

DESCRIPTION OF THE PREFERRED EMBODIMENTS

The present inventive composition preferably comprises 100 parts by weight of at least one vinylidene chloride copolymer; between 5 and 15 parts by weight of a plasticizer; and between 5 and 15 parts by weight of an acrylate/styrene copolymer.

More preferably, the present composition comprises 100 parts by weight of at least one vinylidene chloride copolymer; between 6 and 12 parts by weight of a plasticizer; and between 6 and 12 parts by weight of an acrylate/styrene copolymer.

Most preferably, the present composition comprises 100 parts by weight of at least one vinylidene chloride copolymer; between 8 and 10 parts by weight of a plasticizer; and between 8 and 10 parts by weight of an acrylate/styrene copolymer.

Preferably, the total amount of plasticizer plus acrylate/styrene copolymer is at least 10 parts (to be added to 100 parts of the vinylidene chloride copolymer composition). More preferably, the total amount of these additives is at least 12 parts, even more preferably at least 14 parts. Most preferably, at least 16 parts of the additives are used.

Higher total levels of plasticizer and acrylate/styrene copolymer in the composition provide $O_2$ and $CO_2$ transmission that is very suitable for packaging gassing cheese. In addition, as the total level of these additives goes up, the $CO_2$ transmission typically increases proportionally more than the $O_2$ transmission. This can be seen in Table 3, where the $CO_2/O_2$ ratio shows an increase with an increased total amount of plasticizer plus acrylate/styrene copolymer. Some of this increase is dependent on the specific materials used.

The advantage of this ratio increase is that the $CO_2$ transmission rate can be beneficially increased (very useful in gassing cheese applications) while effecting a smaller increase in the $O_2$ transmission rate. This latter value is desirably kept relatively low so that oxidative degradation of the cheese or other product is retarded.

The composition can be made into monolayer or multilayer film, oriented or unoriented, by means well known in the art.

In a preferred embodiment, a film comprises a four layer film structure: sealant layer/core layer/barrier layer/abuse layer where:

sealant layer=90% ethylene vinyl acetate copolymer (EVA) (6% VA) +10% linear low density polyethylene (LLDPE) which is an ethylene/octene copolymer (6.5% octene);

core layer=ethylene vinyl acetate copolymer (EVA) (15% VA);

barrier layer=(as defined in the Tables); and abuse layer=92.5% ethylene vinyl acetate copolymer (EVA) (9% VA) and 7.5% linear low density polyethylene (LLDPE) which is an ethylene/octene copolymer (6.5% octene).

The sealant and abuse layers can comprise any suitable polymeric material, but preferably comprise an ethylene alpha olefin copolymer, an ethylene unsaturated ester copolymer, an ethylene acid copolymer, other polyolefins, or any combination or blend thereof. The core layer, which is optional, can also comprise any of these materials. Ethylene alpha olefin copolymers are preferably copolymers of ethylene with one or more comonomers selected from $C_3$ to $C_{10}$ alpha olefins. Both heterogeneous and homogeneous materials can be used. Examples of heterogeneous materials include LLDPE (linear low density polyethylene), VLDPE (very low density polyethylene), ULDPE (ultra low density polyethylene), and the like. Homogeneous materials can include metallocene catalyzed polymers (MCP) such as those available from Exxon under the EXACT trademark, and available from Dow under the AFFINITY trademark.

Ethylene unsaturated ester copolymer refers to materials such as ethylene vinyl acetate copolymer (EVA}, ethylene alkyl acrylate copolymers such as ethylene ethyl acrylate copolymer (EEA), ethylene methyl acrylate copolymer (EMA), and ethylene n-butyl acrylate copolymer (EnBA). It also refers to ethylene methyl methacrylate copolymer (EMMA).

Ethylene acid copolymer refers to materials such as ethylene acrylic acid copolymer (EAA), and ethylene methacrylic acid copolymer (EMAA). Metal salt neutralized or partially neutralized versions of these materials, such as ionomer, are also included herein.

EXAMPLES

Table 1 identifies the compositions used in the examples.

Nine compositions of the present invention, as well as a control composition, were tested for thermal stability (shown as degradation in minutes) and free flowability. The results are shown in Table 2.

Table 3 shows the $O_2$ and $CO_2$ transmission rates of four additional examples, compared with the same control. The control composition forms part of the B 625 bag commercially made by Cryovac Division of W. R. Grace & Co.-Conn. Oxygen transmission is measured by ASTM 3985; carbon dioxide transmission is by a coulometric test method; both properties were measured using Mocon equipment.

TABLE 1

| MATERIAL | TRADENAME | SOURCE |
| --- | --- | --- |
| $VDC_1$ | PV324 | SOLVAY |
| $VDC_2$ | MA134 | DOW |
| $P_1$ | Plastolein 9759-A | HENKEL |
| $P_2$ | Plasthall HA7A | C. P. HALL |
| $P_3$ | Plas-Chek 775 | FERRO |
| $P_4$ | Citroflex A-4 | MORFLEX |
| $S_1$ | Metablen P700 | ATOCHEM |
| $S_2$ | Metablen L1000 | ATOCHEM | where:
$VDC_1$ = vinylidene chloride/vinyl chloride copolymer;
$VDC_2$ = vinylidene chloride/methyl acrylate copolymer;
$P_1$ = polymeric condensation product of azelaic acid and 1,3-butandiol;
$P_2$ = polymeric plasticizer of polyester of adipic acid and propylene glycol;
$P_3$ = epoxidized soybean oil;
$P_4$ = plasticizer of acetyl tri-n-butyl citrate;
$S_1$ = methyl methacrylate/butyl acrylate/styrene terpolymer; and
$S_2$ = methyl methacrylate/butyl acrylate/butyl methacrylate terpolymer.

In tables, "phr" means pounds per hundred (weight units) of material. For example, in the control, 100 pounds of saran was blended with 5 pounds of $P_1$, 3 pounds of $P_2$, and 1 pound of $P_3$. An equivalent is "parts by weight".

TABLE 2

| EXAMPLE | COMPOSITION (phr) | DEGRADATION (minutes) | FREE FLOW |
| --- | --- | --- | --- |
| 1 (Control) | 100 $VDC_1$ + 5 $P_1$ + 3 $P_2$ + 1 $P_3$ | 21.0 | very poor |
| 2 | 100 $VDC_1$ + 4 $P_3$ + 5 $S_1$ | 24.0 | excellent |
| 3 | 100 $VDC_1$ + 4 $P_3$ + 10 $S_1$ | 21.0 | excellent |
| 4 | 100 $VDC_1$ + 8 $P_3$ + 5 $S_1$ | 43.0 | very good |
| 5 | 100 $VDC_1$ + 8 $P_3$ + 10 $S_1$ | 38.0 | very good |
| 6 | 100 $VDC_2$ + 4 $P_3$ + 5 $S_1$ | 44.0 | excellent |
| 7 | 100 $VDC_2$ + 4 $P_3$ + 10 $S_1$ | 68.0 | excellent |
| 8 | 100 $VDC_2$ + 4 $P_3$ + 10 $S_1$ | 54.0 | excellent |
| 9 | 100 $VDC_2$ + 4 $P_3$ + 10 $S_1$ | 70.0 | very good |
| 10 | 100 $VDC_2$ + 4 $P_3$ + 10 $S_1$ | 70.0 | very good |

TABLE 3

| EXAMPLE | COMPOSITION (phr) | $O_2$ trans. cc/day · m² | $CO_2$ trans. cc/day · m² | $CO_2/O_2$ ratio |
| --- | --- | --- | --- | --- |
| 1 (Control) | 100 $VDC_1$ + 5 $P_1$ + 3 $P_2$ + 1 $P_3$ | 41.0 | 248.0 | 6.05 |
| 11 | 100 $VDC_1$ + 8 $P_3$ + 8 $S_2$ | 38.0 | 245.0 | 6.45 |
| 12 | 100 $VDC_1$ + 5 $P_3$ + 10 $S_1$ | 31.0 | 200.0 | 6.45 |

TABLE 3-continued

| EXAMPLE | COMPOSI-TION (phr) | $O_2$ trans. cc/day · $m^2$ | $CO_2$ trans. cc/day · $m^2$ | $CO_2/O_2$ ratio |
|---|---|---|---|---|
| 13 | 100 $VDC_1$ + 6 $P_3$ + 10 $S_1$ | 40.0 | 248.0 | 6.2 |
| 14 | 100 $VDC_1$ + 8 $P_4$ + 10 $S_1$ | 37.0 | 278.0 | 7.5 |

Those skilled in the art will understand that modifications to the present invention can be made after review of the disclosure. Such modifications are deemed to be within the scope of the invention as claimed.

For example, although four layer embodiments are disclosed as examples, those in the art will readily understand that one or more layers can be made into a film having the benefits described.

The examples were made by a tubular extrusion coating process, well known in the art. However, other processes, such as flat cast extrusion or coextrusion, lamination, extrusion coating, extrusion lamination and the like can be employed. These alternative processes are well known in the art.

The examples were made by irradiating a substrate (sealant and core layer) prior to extrusion coating of the barrier and abuse layers, and prior to orientation. Alternatively, films of the invention can be totally crosslinked by conventional means such as electronic or chemical crosslinking; post-irradiated, i.e. irradiated after orientation; or made without crosslinking, or without orientation.

Orientation is accomplished by conventional means such as blown bubble or tenterframe. Orientation ratios can be at any suitable range or ratio, including 1:1 to 6:1 in either or both of the machine and transverse directions.

What is claimed is:

1. A multilayer polymeric film comprising:

a) first and second surface layers comprising an olefinic polymer or copolymer; and b) a vinylidene chloride polymeric layer disposed between said surface layers comprising:

i) 100 parts by weight of at least one vinylidene chloride copolymer;

ii) between 4 and 15 parts by weight of a plasticizer; and iii) between 4 anti 15 parts by weight of an acrylate/styrene copolymer;

wherein the total amount of plasticizer and acrylate/styrene copolymer comprises at least 9 parts by weight.

2. The film of claim 1 wherein the surface layers comprise a material selected from the group consisting of ethylene alpha olefin copolymer, ethylene unsaturated ester copolymer, ethylene acid copolymer, and blends thereof.

3. The film of claim 1 wherein the plasticizer is a member selected from the group consisting of polymeric condensation product of azelaic acid and 1,3-butandiol; polyester of adipic acid and propylene glycol; epoxidized soybean oil; and acetyl tri-n-butyl citrate.

4. The film of claim 1 wherein the acrylate/styrene polymer is a member selected from the group consisting of methyl methacrylate/butyl acrylate/styrene terpolymer, methyl methacrylate/butyl acrylate/butyl methacrylate terpolymer, poly (alpha-methyl styrene), and blends thereof.

5. The film of claim 1 wherein at least one layer of the film is cross-linked.

6. The film of claim 1 wherein at least one layer of the film is oriented.

7. A package made from the film of claim 1.

* * * * *

UNITED STATES PATENT AND TRADEMARK OFFICE
CERTIFICATE OF CORRECTION

PATENT NO. : 5,538,770

DATED : Jul. 23, 1996

INVENTOR(S) : Solomon Bekele

It is certified that error appears in the above-identified patent and that said Letters Patent is hereby corrected as shown below:

Column 6, line 11, after "4" delete "anti", insert ---and---.

Signed and Sealed this

Nineteenth Day of November, 1996

Attest:

BRUCE LEHMAN

Attesting Officer   Commissioner of Patents and Trademarks